United States Patent
Gea Aguilera et al.

(10) Patent No.: US 11,525,365 B2
(45) Date of Patent: Dec. 13, 2022

(54) TURBOMACHINE WITH SERRATED-PROFILE FLOW-SPLITTER NOSE

(71) Applicant: SAFRAN AIRCRAFT ENGINES, Paris (FR)

(72) Inventors: Fernando Gea Aguilera, Moissy-Cramayel (FR); Matthieu Fiack, Moissy-Cramayel (FR); Mathieu Simon Paul Gruber, Moissy-Cramayel (FR)

(73) Assignee: SAFRAN AIRCRAFT ENGINES, Peris (FR)

( * ) Notice: Subject to any disclaimer, the term of this patent is extended or adjusted under 35 U.S.C. 154(b) by 0 days.

(21) Appl. No.: 16/970,526

(22) PCT Filed: Feb. 15, 2019

(86) PCT No.: PCT/FR2019/050352
§ 371 (c)(1),
(2) Date: Aug. 17, 2020

(87) PCT Pub. No.: WO2019/158877
PCT Pub. Date: Aug. 22, 2019

(65) Prior Publication Data
US 2020/0408101 A1    Dec. 31, 2020

(30) Foreign Application Priority Data

Feb. 16, 2018 (FR) ........................ 1851361

(51) Int. Cl.
*F01D 9/04* (2006.01)
*F01D 5/14* (2006.01)
*F02C 7/045* (2006.01)

(52) U.S. Cl.
CPC ............. *F01D 9/041* (2013.01); *F01D 5/141* (2013.01); *F02C 7/045* (2013.01);
(Continued)

(58) Field of Classification Search
CPC ..... F01D 9/00; F01D 9/02; F01D 9/04; F01D 9/041; F01D 9/042; F01D 5/14;
(Continued)

(56) References Cited

U.S. PATENT DOCUMENTS

| | | | |
|---|---|---|---|
| 4,786,016 A | * | 11/1988 | Presz, Jr .................. B63B 3/38 244/130 |
| 2013/0108450 A1 | * | 5/2013 | Ingram ................... F01D 5/143 416/223 A |

(Continued)

FOREIGN PATENT DOCUMENTS

| | | |
|---|---|---|
| CH | 701 814 A2 | 3/2011 |
| CN | 101 716995 A | 6/2010 |

(Continued)

OTHER PUBLICATIONS

International Patent Application No. PCT/FR2019/050352, International Search Report and Written Opinion dated Apr. 24, 2019, 11 pgs.
(Continued)

*Primary Examiner* — Eldon T Brockman
*Assistant Examiner* — Elton K Wong
(74) *Attorney, Agent, or Firm* — Lathrop GPM LLP (57) ABSTRACT

A front fan turbomachine includes an annular separating wall having a slat for separating an air flow between a primary flow and a secondary flow, the slat having a leading edge; inlet guide vanes (IGV) for guiding the primary flow and outlet guide vanes (OGV) blades for guiding the secondary flow. The leading edge of the slat has a serrated profile having a succession of teeth and depressions.

17 Claims, 3 Drawing Sheets

(52) U.S. Cl.
CPC .. *F05D 2220/323* (2013.01); *F05D 2240/121* (2013.01); *F05D 2250/183* (2013.01); *F05D 2250/184* (2013.01); *F05D 2260/96* (2013.01)

(58) Field of Classification Search
CPC .......... F01D 5/141; F01D 5/143; F01D 25/24; F01D 17/105; F02C 7/045; F05D 2240/121; F05D 2260/606; F05D 2260/96; F05D 2250/183; F05D 2250/184; F05D 2220/323; F04D 29/66; F04D 29/661; B64D 29/00; B64C 7/02; F02K 1/386
See application file for complete search history.

(56) References Cited

U.S. PATENT DOCUMENTS

| | | |
|---|---|---|
| 2015/0017012 A1 | 1/2015 | Pouzadoux et al. |
| 2015/0360790 A1* | 12/2015 | Rouyre ............... F02C 7/045 244/53 B |
| 2016/0003095 A1* | 1/2016 | Romano ............... F01D 5/02 415/1 |
| 2017/0226865 A1 | 8/2017 | Kray et al. |
| 2018/0057141 A1* | 3/2018 | Shormann ........... F01D 9/041 |
| 2019/0063368 A1* | 2/2019 | Phelps ................. F02K 3/06 |

FOREIGN PATENT DOCUMENTS

| | | |
|---|---|---|
| DE | 196 34 296 A1 | 4/1997 |
| EP | 1 277 966 A2 | 1/2003 |
| EP | 3 002 210 A1 | 4/2016 |

OTHER PUBLICATIONS

French Patent Application No. 1851361, Search Report dated Oct. 22, 2018, 19 pgs.

\* cited by examiner

TURBOMACHINE WITH SERRATED-PROFILE FLOW-SPLITTER NOSE

CROSS-REFERENCE TO RELATED APPLICATIONS

This application is a 35 U.S.C. § 371 filing of International Application No. PCT/FR2019/050352 filed Feb. 15, 2019, which claims the benefit of priority to French Patent Application No. 1851361 filed Feb. 16, 2018, each of which is incorporated herein by reference in its entirety.

The invention concerns the field of aero-acoustic management of stationary blades in an aircraft turbomachine or in an aircraft turbomachine test bench.

This type of stationary blade is found, for example, on OGV (outlet guide vanes), or rectifiers, arranged downstream of a rotating body to straighten the airflow. The term stator blade or guide vane is used to designate a stationary blade, as opposed to rotating blades.

An example will be given for a turbo-fan engine having a (front) fan and a downstream guide vane arranged in the secondary air vein.

In a certain number of turbofan engines, particularly in the Ultra-High Bypass Ratio turbofan engines (UHBR; ultra-high dilution ratio fairing fan engine configuration, above 15), it is envisaged to increase the diameter of the fan and reduce the length of the suspension pod by which the turbomachine is suspended to the aircraft, thus reducing the distance between the fan and the intake guide vanes of IGVs (inlet guide vanes), the OGVs and the slat. In this type of engine, the interaction of the wake generated by the fan with the IGVs, the OGVs and the slat is one of the dominant broad band sources of noise.

Consequently, new technical solutions must be analysed to maintain and reduce current sound levels.

The invention thus concerns a turbomachine having a (front) fan and which has a general axis (X) about which the fan can rotate, the turbomachine comprising:
    an annular dividing wall having a slat, for dividing the airflow downstream of the fan into a primary flow and a secondary flow, the slat having a leading edge,
    first guide vanes (IGV) for guiding the primary flow,
    second guide vanes (OGV) for guiding the secondary flow.

The interaction between the flow set in rotation by the fan and the rectifier in the secondary duct is at the origin of a source of noise that is supposed to predominate over the total noise generated by the turbomachine, or even by the aircraft depending on the operating regimes.

In this context, in order to at least limit all or part of the above-mentioned problems, it is proposed that the leading edge of the slat of said annular dividing wall should have a serrated profile having a succession of teeth and depressions.

In other words, it is proposed here to use a undulated leading edge slat to reduce the interaction noise between the fan blade wake and the slat. It should be noted in this regard that the axial distance between the slat and the trailing edge of the fan blades is relatively short, and therefore the slat may be exposed to higher levels of air turbulence than those perceived by OGVs and IGVs.

For aerofoils having a serrated, i.e. undulated, leading edge, irrespective of the shape of the undulations (see below), the interaction noise having turbulent flow is generated in particular at the depressions of the undulations, where the pressure fluctuations are more intense.

A corollary goal is therefore to optimize the undulation geometry to reduce the noise radiated by a undulated leading edge slat by minimising the correlation between the noise sources and the bottom of the depressions.

In order to reduce this correlation, all or part of three criteria were considered, to define the undulations, which could be sinusoidal or triangular, among others.

More precisely, it is proposed to consider a profile having serrations presenting undulations:
    that define:
    along a direction of elongation of the leading edge, an elementary geometry which repeats itself (whose profile thus obeys a periodic law), two identical undulations of two successive elementary geometries along said direction having between them, along said direction, a distance, $\lambda$ (in m), and
    a maximum amplitude, h (in m), perpendicular to said direction, and
    which meet at least one of the following criteria a), b), c):
a) the maximum amplitude is dimensioned according to the relation: $l_{11}^{(1)}/h<1$ to within 40%, in the formula:

$$l_{ij}^{(k)} = \int_0^\infty \frac{\langle u_i'(x+rn_k)u_j'(x)\rangle}{\langle u_i'(x)u_j'(x)\rangle}dr$$

to calculate the integral length scale of the i-th and j-th fluctuating velocity components in the k-th spatial direction, wherewith:
    i, j and k are subscripts that define spatial directions;
    x corresponds to a position of a point in the flow field;
    $u'_i$ (in m/s) which is the air flow velocity in direction i, between the fan and the first guide vanes (5, IGV),
    r which is the distance (in m) between two points in the wake, i.e., downstream—of the fan—in the k-direction,
    $n_k$ is a unit vector in the k-th direction; and
    $l_{11}^{(1)}$ which is the integral scale of the airflow generated by the fan:
        in (parallel to) the general axis of the turbomachine (X axis on FIG. 2), or
        in the direction of a chord of the serrated profile (if such a chord exists; see item 40 on FIG. 3),
b) said distance ($\lambda$) (i.e. the periodicity or spacing between two consecutive teeth) respects the following relationship:

$$e<\lambda \leq d-e \text{ where } d/\lambda \neq 1, 2, 3, \ldots, \text{ having:}$$

e, which is the width (in m) defining the wake deficit (of airflow) generated by the fan downstream of a blade of the fan, said width being calculated at the point where half of the maximum turbulent kinetic energy, K_max, is found in the corresponding part of the generated airflow, hence in said wake; e being able to be estimated from the criterion $e=l_{22}^{(2)}/0.21$ (where $l_{22}^{(2)}$ is the integral scale of the airflow generated by the fan in the circumferential direction), to within 40%, where $l_{22}^{(2)}$ corresponds to the integral length scale of the airflow (38) generated by the front fan (14), in the circumferential direction (40) of the profile, or perpendicular to the general axis (X) of the turbomachine, and
    d which is the spacing (in m) between two circumferentially consecutive fan blades (see FIG. 13),
c) the number of teeth, depressions, or repetition periods of the elemental geometry along the length of the leading edge of the serrated profile is equal to or less than 40% of the number of first guide vanes (IGV).

In this text:
the dimensional parameters (amplitude, distance, speed, etc.) are to be considered in SI (International System) units, and the margin "to within 40%" may be reduced to within 10%, if necessary. This will result in a further reduction in the noise diffused, at a constant rotation speed of the front fan, by said undulated leading edge slat.

Figure 13:
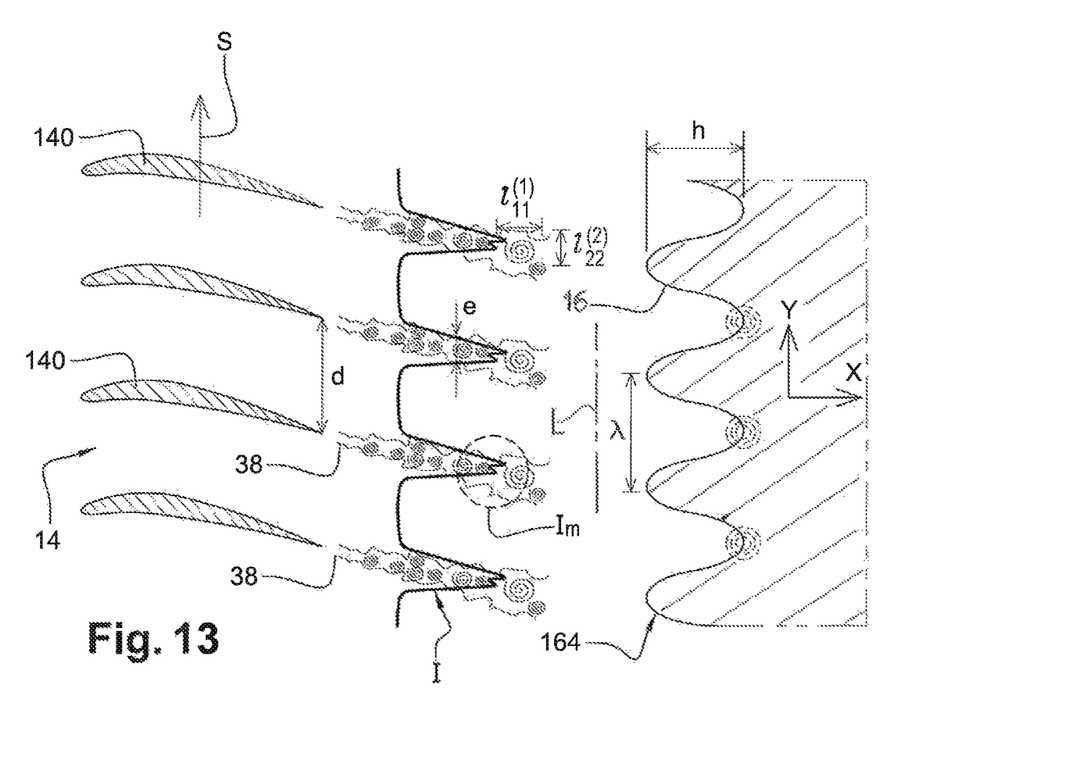
FIG. 13 shows the turbulent air flow intensity curve along the circumferential direction Y between the front fan blades and an example of the tightened profiles of the flow dividing slat; this figure represents a constant radius section made at the slat.

Furthermore, with regard to the subscripts or exponents (i, j, k) in the formulae in this text, it is noted that, for example, FIG. 13 shows fan blade profiles 140, as well as downstream flow wake and a slat 16, where, if the subscripts (i, j, k):

are equal to 1, they correspond to the "X" direction (general axis of the turbomachine), are equal to 2, they correspond to the "Y" (circumferential) direction.

Thus, the direction of elongation of the leading edge of the slat 16 (L in FIG. 2 or 13) corresponds to the circumferential direction "Y", or exponent "2" of $l_{22}^{(2)}$ on FIG. 13.

It will also be understood that "r" is the integration variable in the above equation relating to $l_{ij}^{(k)}$, for the calculation of the integral scale. If there is not strictly a "chord" as in the case of a slat (marked 16 below) dividing the airflow in said primary flow and said secondary flow, it will be considered that "in the direction of the chord (marked 40 below) of the profile" corresponds, in this case, to the direction of said general axis.

Normally, at least having a profile having a periodic elementary geometry that is not excessively tortured, it should be found that the airflow or stream generated by the fan bypasses the undulated leading edge at the (tops of the) teeth and accelerates near the depressions.

In this case, in order to avoid having excessively large areas of turbulence and/or overspeed at the level of the casing area of the leading edge of the first guide vanes (IGV), it is proposed that around said general axis (X), at least some of the depressions of the serrated profile are angularly offset with respect to the angular position of the first guide vanes (IGV), so that these (at least some of the) depressions are angularly interposed between two circumferentially successive first guide vanes (IGV).

The air flow generated axially downstream of the fan is swirling and is strongly influenced by the direction of rotation and speed of the fan.

In order to take this into account so that the tooth surfaces can be as fully active as possible in the expected acoustic effect, it is proposed that the teeth develop individually in an inclined manner with respect to a parallel to said general axis (X), so that they are oriented towards the direction of rotation—generally oblique with respect to said X axis—of the rotating flow thus—generated by the rotation of the fan.

In other words:
the fan is adapted to rotate in a predetermined direction about said general axis (X) so that the air flow downstream of the fan will be generally obliquely oriented with respect to said axis (X), and the teeth can then be inclined circumferentially around said general axis (X) towards the generally oblique orientation of the air flow downstream of the fan, to face it generally.

It is also possible that the teeth are inclined in the direction of the IGV camber, as the direction of the air flow can vary depending on the speed of the fan.

In both cases, the teeth will in fact individually be axially non-symmetrical with respect to a parallel to said general axis (X) passing through the top of the tooth in question.

In principle, the inclination will be the same for all the teeth, even if different inclinations according to the teeth are possible.

Also to take into account the influence of the fan rotation, and to limit the acoustic impact on the IGVs of said swirling air flow, it is also proposed:

a) in that said second guide vanes (IGV) have a mean camber line overall, at least some of the teeth are oriented circumferentially about said general axis (X) generally in the direction of a tangent to the mean camber line of these IGVs, at the leading edges of the latter, it being possible for the tangent to form an angle which is not zero with respect to the direction of the general axis (X) of the turbomachine and/or b) that, in the direction of said general axis (X), the bottoms of the depressions of the serrated profile belong at least for some of them to a first surface transverse to said general axis (X), this first surface being positioned further downstream or upstream than a second surface transverse to said general axis (X) to which at least some of the leading edges of the second guide vanes (IGV) belong.

Point (a) ensures a favourable angular orientation of the air flow in relation to the shape of the IGVs, point (b) ensures a continued downstream guidance of the air flow in relation to the IGVs, so that the air flow attacks them while it is still sliding along the teeth and is therefore still directly oriented by them.

In terms of shape, it is further proposed that the teeth and depressions of the serrated profile should individually have a wavy shape, having rounded or sharp tops.

The advantage of rounded tops is that this avoids too high concentrations of mechanical stress locally and thus provides better strength over time. The advantage of sharp tops is that it has an increased noise reduction potential.

A further consideration is that the teeth and depressions of the serrated profile are individually shaped having locally straight side walls, having the same advantage.

Although presented in relation to aircraft propulsion, the characteristics of the turbomachine could concern other applications, whether land or sea.

The invention will be better understood, if need be, and other details, characteristics and advantages of the invention will appear upon reading the following description given by way of a non restrictive example while referring to the appended drawings wherein.

In these drawings.

Figure 1:
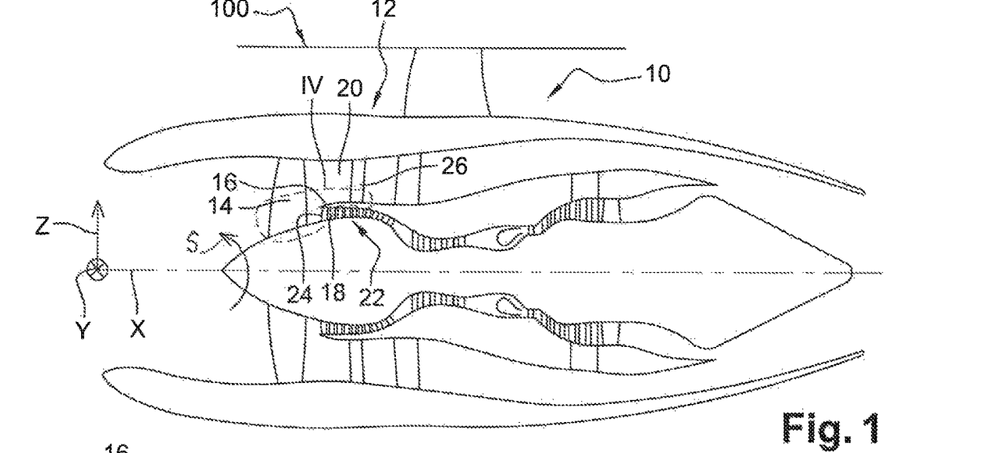
FIG. 1 is a longitudinal cross-sectional view (X axis) of a typical turbomachine for an aircraft.

Referring to FIG. 1, an aircraft 100 turbojet 10 is schematically represented and defined as follows:

The pod 12 is used as the outer casing for the various components, including, at the front (left in FIG. 1), an upstream fan 14 (AM).

Downstream (AV) of the fan 14, the airflow (locally schematised in 38 in FIG. 4) is divided by the separating slat 16 of an annular wall 160 into a primary airflow and a secondary airflow. The primary airflow flows through an internal annular air passage or primary jet 18 when entering the low-pressure compressor 22 at the intake guide vanes 24 IGV, also called first vanes. The secondary airflow is diverted by the separating slat 16 into an external annular air passage 20 (secondary jet) towards the outlet guide vanes 26 OGV, also called secondary vanes, and then towards the engine outlet.

Figures 2, 3, 4, 5, 6, 7, 8:
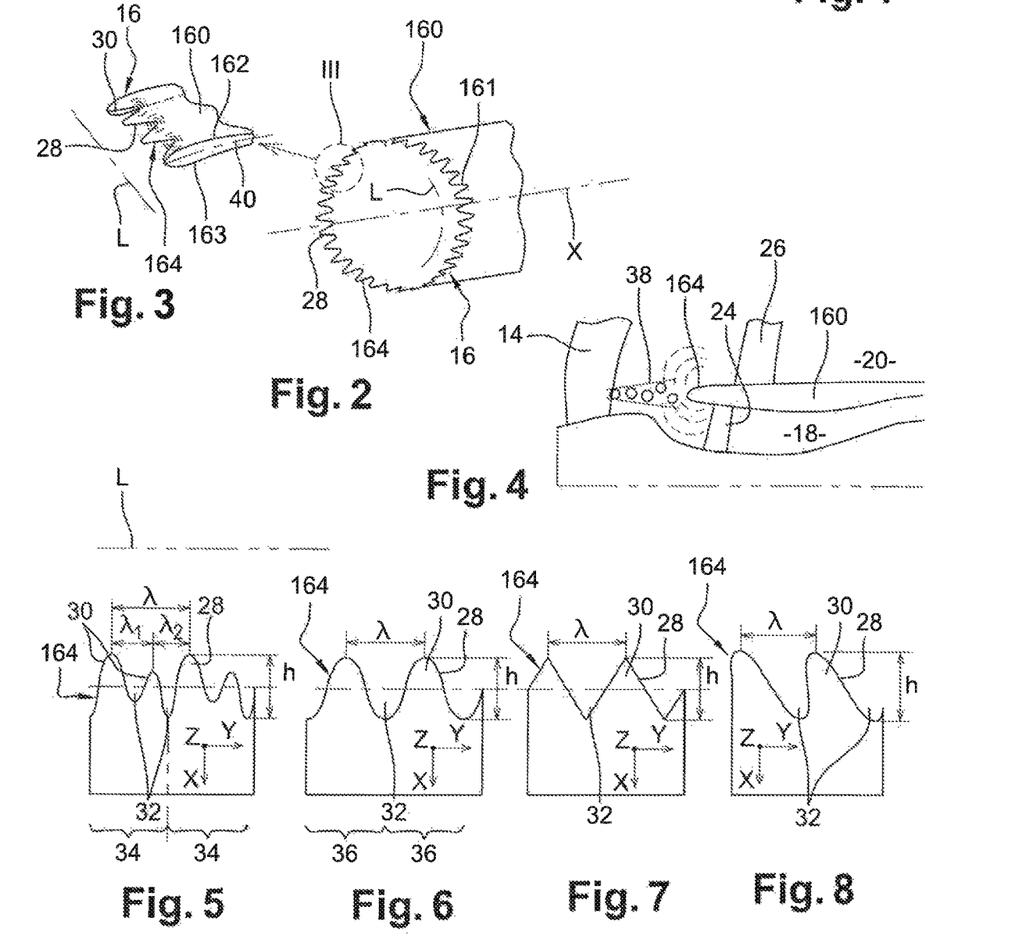
FIG. 2 shows the upstream zone (slat) of the dividing wall between the primary and secondary flows, having a solution in accordance having the invention.
FIG. 3 corresponds to the detail III of FIG. 2.
FIG. 4 corresponds to the detail IV of FIG. 1.
FIGS. 5 and 8 show various serrated profiles shapes according to the invention.

In FIG. 2, we can visualize more precisely the front part 161 of the separating slat 16, which includes the leading edge 164 located furthest upstream and at which the outer wall 162 of the separating slat 16 meets the inner wall 163 of the separating slat 16, the upper wall 162 forming the inner shell of the secondary jet 20.

In the present text, axial refers to anything extending along or parallel to the longitudinal axis (X) of rotation of the concerned part of the turbomachine, the axis being in principle the main axis of rotation of the turbomachine. Anything radial (axis Z) and circumferential is that which extends radially to the X axis and around it, respectively. All that is radially so, with respect to the X axis is internal or inner and external or outer. Thus, the inner wall 163 is the radially inner wall of the separating slat 16. Moreover, any references to upstream and downstream are to be considered in connection having the flow of gases in the (part of the) turbine engine under consideration: these gases enter upstream and exit downstream, generally circulating parallel to the aforementioned longitudinal axis of rotation.

In addition, the attached drawings, and the descriptions relating to them, have been defined having reference to the conventional orthogonal reference mark X-Y-Z, having the X axis as defined above.

The separating slat 16 is hollow: the outer face of the wall 162 serving as the radially inner boundary to the outer annular air passage 20 receiving the secondary flow while the inner face of the wall 163 serves as the radially outer boundary to the inner annular air passage 18 receiving the primary flow.

The lower wall 163 of the separating slat 16 forms the outer shell of the low-pressure compressor 22.

Although the axial offset (X) downstream of the outlet 26 IGVs 24 from the leading edge 164 of the separating slat 16 is less than that of the OGVs 26 from the same leading edge 164, the portion of the front part 161 directly adjacent to the leading edge 164 of the separating slat 16 is clear.

For the induced effect of aero-acoustic management by limiting the noise generated by this zone, it can therefore be predicted that this leading edge 164 has a profile 28 having a succession of teeth 30 and depressions 32.

To reduce the correlation between noise sources along the serration 28 profile leading edge, it is proposed to consider some or all of three criteria for serrations, which could be sinusoidal or triangular, among others, as shown in the figures.

First Criterion: Full Scale of Turbulence.

It is proposed to estimate the wavelength of the serrations, λ, and the amplitude, h, from the integral scales of turbulence.

More precisely, we will consider that the serrated profile 28 presents undulations that define:

along a direction (L) of elongation of the leading edge 164 (FIGS. 2-3), an elementary geometry which repeats itself, two identical (or quasi-identical, when two consecutive teeth have small variations in geometry, to +/−15%) undulations of two successive elementary geometries, such as 34, 36 FIGS. 5-6, along said direction L having between them, in this direction, a distance, λ (in m), and a maximum amplitude, h (in m), perpendicular to this direction L.

The maximum amplitude h is defined as the maximum distance, along the X axis, between the top—the most prominent if any—of teeth 30 and the bottom of the depressions 32—the deepest if any—, as shown in FIG. 5 under the assumption of an elementary geometry having several, preferably two undulations—two different teeth 30 and two different depressions 32—, in this case having: λ=λ1+λ2.

According to this first criterion, the maximum amplitude h is chosen to be dimensioned according to the relation:

$$l_{11}^{(1)}/h<1$$

to within 40%, in the general formula:

$$l_{ij}^{(k)} = \int_0^\infty \frac{\langle u_i'(x + rn_k)u_j'(x)\rangle}{\langle u_i'(x)u_j'(x)\rangle} dr$$

(*)

to calculate the integral length scale of the i-th and j-th fluctuating velocity components in the k-th spatial direction, where:

i, j and k are subscripts that define spatial directions;

x corresponds to a position of a point in the flow field;

$u'_i$ (in m/s) which is the air flow velocity in direction i and between the fan 14 and the guide vanes IGV 24, r which is the distance (in m) between two points in the wake of the fan in the k-direction, $n_k$ is a unit vector in the k-th direction; and $l_{11}^{(1)}$ which is the integral scale of the airflow 38 (FIG. 4) generated by the fan 14 in the direction of the general machine axis (FIG. 2) or the chord 40 of the profile (FIG. 3).

(*): For further details or explanations, please refer to formula (5) and its associated data as published in the AIAA conference paper "Wavy Leading Edge Airfoils Interacting having Anisotropic Turbulence", AIAA 2017-3370; page 4/16. It specifies that: $u'_i$ represents the nth component of said airflow velocity, r is the distance between two points in the kth direction, ek is a unit vector in the kth direction, and <.> is the ensemble average operator. Therefore, $l_{ij}^{(k)}$ is the integral length scale of the nth and jth components of said velocity in the kth spatial direction.

Using these definitions, the serration size used to optimize the broadband noise of a profile 28 shall satisfy:

$$l_{11}^{(1)}/h<1 \text{ and } l_{22}^{(2)}/\lambda \leq 0.5$$

where $l_{11}^{(1)}$ and $l_{22}^{(2)}$ will be the integral scales of the turbulent airflow 38 in the directions of airfoil chord 40 (substantially along said general axis therefore) and leading edge 164 extension direction L, respectively (see FIGS. 5-8 and 13).

These values are used to optimize the reduction of broadband noise generated by the slat 16 in the presence of an isotropic turbulent airflow.

However, this can be considered not to be the case for the airflow 38, or wake, of fan 14, which is not in fact isotropically turbulent when it is operating.

Therefore, it can be decided to apply the following second criterion, alone or in combination having the first criterion, for a favourable adaptation to the operational specificities of a slat such as 164.

Second Criterion: Reduction of Depressions Having Maximum Acoustic Radiation.

It is therefore proposed to reduce the number of leading edge 164 depressions 32 that are impacted by individualized airflows 38, simultaneously. FIG. 13 thus allows us to observe that the maximum levels (zones Im) of the intensity (or rate) I of airflow 38 are in the wakes that each blade 140 of fan 14. These maximum levels are directly related to the amplitude of the acoustic radiation from the slat 16.

In order to reduce the number of depressions 32, it is first proposed to apply an additional condition to the design and construction of the serrated profile leading edge 164 to prevent a single wake of blade 140 of the fan from impacting two circumferentially consecutive depressions 32 substantially simultaneously.

Figure 12:
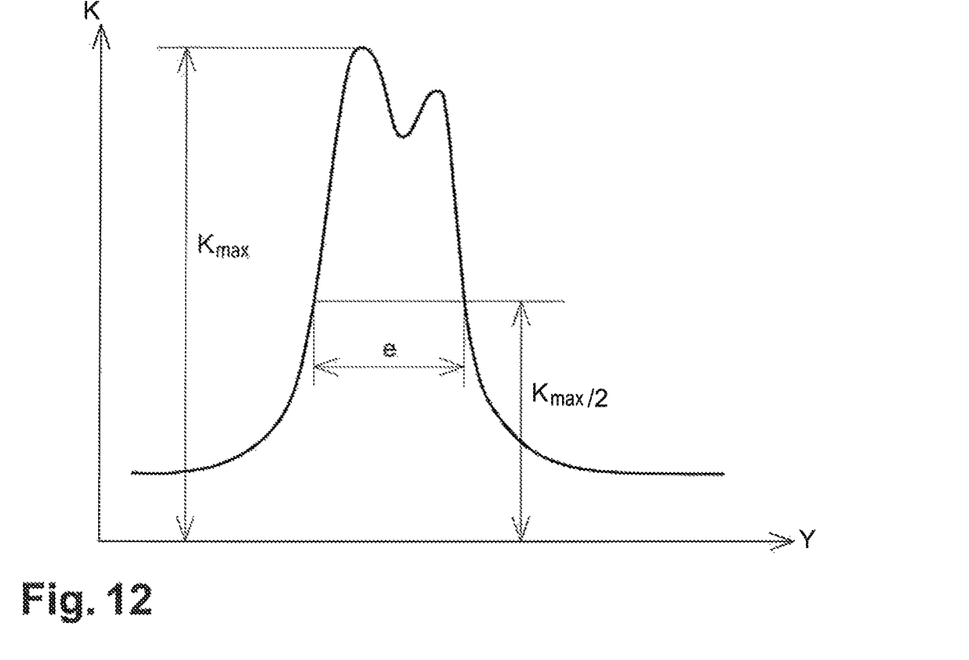
FIG. 12 is a curve of the evolution of the turbulent kinetic energy of the primary airflow, K, following a fan blade at constant blade height, in the circumferential direction Y; and in particular.

This condition is given by $\lambda > e$, where e corresponds to the width of the wake—airflow 38 generated by the fan—downstream of a blade 140, approximately in its continuity (see FIG. 13). This local wake width is calculated at the point where half of the maximum turbulent kinetic energy is found $K_{max}$, in the wake of this blade, facing the leading edge 164 of the slat 16, as shown in FIG. 12. The value e can be estimated from test data or from the criterion $e = l_{22}^{(2)}/0.21$ to within 40%. Integral scales of turbulence can also be estimated from Computational Fluid Dynamics (CFD) calculations.

Secondly, it is proposed to additionally apply another condition to take into account the spacing or distance d between two circumferentially consecutive fan blades 140; see FIG. 13 where the distance d is defined as the distance between two trailing edges of two consecutive fan blades. The aim is to avoid a maximum sound radiation of several depressions 32 due to the impact of the wake of several fan blades 140 simultaneously. Noise reduction should be less effective if the number of blades is equal to the number of depressions that radiate the maximum noise.

Therefore, it is proposed as another condition, for the periodicity or spacing between two consecutive teeth 30, i.e. for said distance ($\lambda$), that:

$$e < \lambda \leq d - e \text{ where } d/\lambda \neq 1, 2, 3, \ldots, \text{ therefore having:}$$

$\underline{e}$ which is the width (in m) of the turbulent airflow 38 (called "fan wake" in technical vocabulary) generated by the fan downstream of a blade 140, said width being calculated at the point where half of the maximum turbulent kinetic energy, K_max, is found in the corresponding part of the generated air flow, preferably facing (or close to) the leading edge of the slat, cf. FIG. 13; $\underline{e}$ can be estimated from criterion $\underline{e} = l_{22}^{(2)}/0.21$, to within 40% (see general formula above) where $l_{22}^{(2)}$ corresponds to the integral length scale of the airflow (38) generated by the front fan (14), in the circumferential direction (40) of the profile, or perpendicular to the general axis (X) of the turbomachine, and $\underline{d}$ is the spacing (in m) between two circumferentially consecutive fan blades 140, preferably at (or near) the leading edge of the slat, see FIG. 13

Criterion "e" will be advantageously calculated at the point closest to the leading edge of the slat.

Third Criterion: Positioning of the Depressions in Relation to the IGVs.

Figure 9:
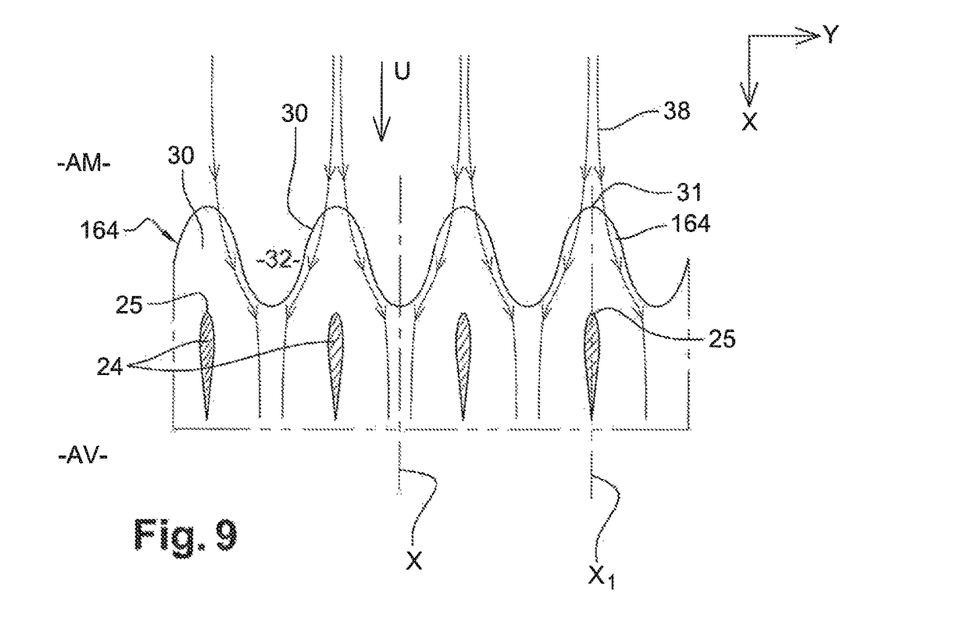
FIGS. 9-11 schematise serrated profiles according to the invention, and airflow lines.
Figure 10:
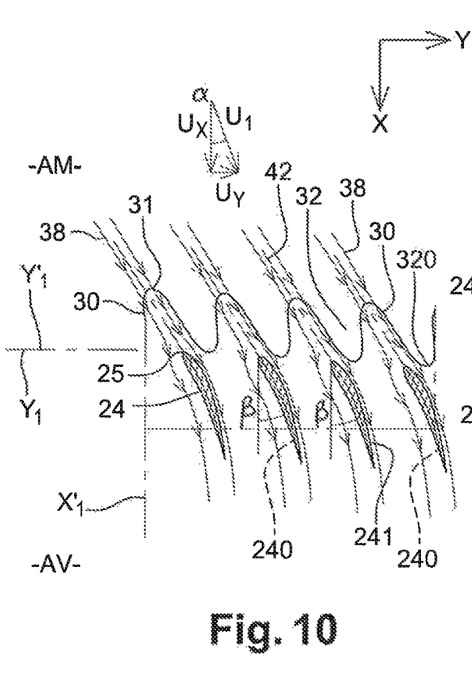
Figure 11:
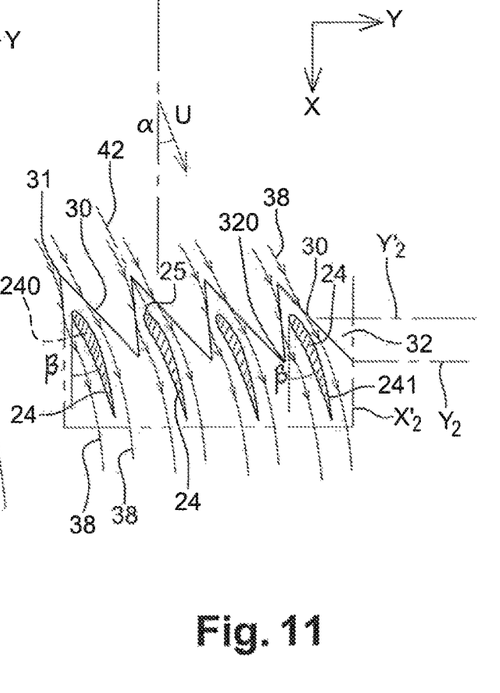

Normally, airflow 38 will bypass the leading edge 164 at the tops of teeth 30 and accelerate near the bottoms of the depressions 32; see the flow lines shown in FIGS. 9-11.

It is therefore proposed, in substitution for or in addition to all or part of the preceding conditions, to apply another condition to the design and construction of the leading edge 164 having a serrated profile, namely that the number of teeth 30, depressions 32, or periods (see $\lambda$ FIGS. 5-8) of repetition of the elementary geometry over the length (direction $\underline{L}$; thus here the perimeter) of the leading edge 164 of the serrated profile is equal, to within 40%, to the number of the first IGV guide vanes 24

As shown in FIGS. 9-11, placing IGV 24 in aerodynamic alignment having teeth 30, if the number of IGV 24 and teeth 30 at the leading edge 164 is in the above proportion, will also be favourable.

Thus, to prevent significant areas of turbulence from impacting the leading edge of the IGVs in the casing area, it is proposed that, around the X axis, at least some of the depressions 32 of the serrated profile 28 be angularly offset (circumferentially) from the angular position of the IGV 24, such that these depressions 32 are interposed between two first circumferentially successive IGV 24, as shown in FIGS. 9-11.

In these figures, the IGV 24 are even placed axially (X) in the continuity of teeth 30; more precisely each IGV 24 has been placed substantially in alignment, along the X axis, having the top of tooth 30 which precedes it upstream.

In FIG. 9, this alignment is parallel to the general X axis. And teeth 30, which each have a top 31, are individually symmetrical there with respect to a parallel to the X axis, this parallel passing through the top 31 of the tooth 30 considered (see the parallel X1 for example).

In FIGS. 10-11, the IGV 24 are inclined in the X-Y plane with respect to the X axis; angle β. The teeth 30 can thus be inclined circumferentially around this X axis at the same angle β and in the same direction as the common IGV 24. Alternatively, taking into account the influence of the rotation of fan 14 (see arrowhead in the example in FIG. 2), the teeth can be tilted in the direction of flow downstream of the fan (which, as shown in FIGS. 10-11, can form an angle α having the X axis).

An angle α and/or β between 15 and 60° might be appropriate, given the initial results of tests carried out. This is therefore not limiting.

Thus, both the (leading edges of the) IGV 24 and the (leading edges of the) teeth 30 are in fact generally facing the airflow 38 whose overall oblique orientation $\underline{U}$ is the result of its components Ux following X and Uy following Y, taking into account the agreed direction of rotation of fan 14 (arrow S).

In addition, teeth 30 are individually axially non-symmetrical in relation to a parallel (see X'1 and X'2 FIGS. 10-11) to the general axis X, again through the top 31 of the tooth in question.

The purpose of these positions can be considered to be twofold. First, it is to avoid the interaction between the accelerated and turbulent flow produced in depressions 32 and the leading edge 25 of the IGVs (FIGS. 9-11). This can contribute significantly to the noise of the low-pressure compressor 22. Secondly, this technical solution can be used to optimise the air intake of this low-pressure compressor 22 and to reduce any aerodynamic losses.

As shown in FIGS. 10-11, these first guide vanes/IGV 24 may individually exhibit a line 240 of average camber along their chord, to account for the influence of fan 14 rotation.

In the example shown, the upper surface 241 is facing in the positive Y direction, the lower surface on the opposite side.

Under these conditions, and also to limit the acoustic impact on the IGV 24 of the swirling air flow that fan 14 thus generates downstream, it is also proposed, as shown in FIGS. 10-11, that the teeth 30 be, circumferentially around said general axis X, oriented globally in the direction of a tangent 42 to said line 240 of mean camber of the IGV 24, at their leading edges 25 to improve the incidence of relative flow impacting the IGVs in the vicinity of the primary vein casing and thus limit potential negative impacts in terms of disbonds, and/or loss of IGV grid performance. By "overall", we mean identical angles, to within 40%. As shown in FIGS. 10-11, said tangent may form a non-zero angle, acute in the direction of flow, with respect to the direction of the general axis (X) of the turbomachine, which is itself directed downstream.

Systematically, along the general X axis, teeth 30 are located upstream from the leading edges 2 of the IGV 24, as can be seen in the figures.

However, in order to increase the size of the teeth, which may benefit noise reduction, it is proposed that, still in this direction of the X axis, the bottoms 320 of the depressions 32 of the serrated profile 28 belong at least for some of them to a first surface, transverse to said X axis, marked Y1 FIG. 10 and Y2 FIG. 11, positioned at (FIG. 10) or offset further upstream (AM) or downstream (AV; FIG. 11) than a second surface also transverse to the X axis, marked Y'1 FIG. 10 and Y'2 FIG. 11, to which belong at least some of the leading edges 25 of the IGV 24. In spite of the illustrations, this is a priori independent of the shape of the tops of teeth 30 and the bottoms 320 of the depressions 32. A more upstream positioning would also be possible, having an effect comparable to that mentioned above.

In this respect, teeth 30 and depression 32 of the serrated profile 28 will individually have a undulated shape, having rounded (FIG. 10) or sharp (FIG. 11) tops, to help reduce the airflow impact noise generated by the fan blades, and in the case of the undulations, to reduce the stress concentrations locally. [001 ] As for the shape of the side walls, marked 300 FIG. 11, of these teeth 30 and depressions 32, they may be individually and locally straight (FIG. 11), representing another potentially efficient fabrication process. This can introduce some decorrelation or phase shift between noise sources along the leading edge.

The invention claimed is:

1. A turbomachine having a front fan (14) in which an airflow can circulate from upstream to downstream, the turbomachine having a general axis (X) about which the front fan can rotate, the front fan generating a wake downstream when it rotates, the turbomachine comprising:
   an annular dividing wall (160) having a slat (16), for dividing the airflow downstream of the fan (14) into a primary flow and a secondary flow, the slat (16) having a leading edge,
   first guide vanes (IGV 24) for guiding the primary flow (Fp),
   second guide vanes (OGV 26) for guiding the secondary flow (Fs),
   characterised in that the leading edge of the slat (16) of the annular dividing wall (160) has a serrated profile (28) having a succession of undulations comprising teeth (30) and depressions (32):
   that define:
      along a direction (L) of elongation of the leading edge, a repeating elementary geometry, two identical undulations of two successive elementary geometries (34, 36) along said direction (L) having between them, along said direction, a distance ($\lambda$),
      and a maximum amplitude (h), perpendicular to said direction (L) along which the leading edge has a length, and
   which meet at least one of the following criteria a), b), c):
   a) the maximum amplitude (h) is dimensioned according to the relation: $l_{11}^{(1)}/h<1$ to within 40%, using the equation:

$$l_{ij}^{(k)} = \int_0^\infty \frac{\langle u_i'(x+rn_k)u_j'(x)\rangle}{\langle u_i'(x)u_j'(x)\rangle} dr$$

to calculate the integral length scale of the i-th and j-th fluctuating velocity components in the k-th spatial direction, where:
      i, j and k are subscripts that define spatial directions;
      x corresponds to a position of a point in the flow field;
      $u'_i$ corresponds to the airflow (38) turbulent velocity component in i-th direction, between the front fan (14) and the first guide vanes (24, IGV);
      $u'_j$ corresponds to the airflow (38) turbulent velocity component in the j-th direction;
      r corresponds to the distance between two points downstream of the front fan (14) in the k-th direction;
      $n_k$ is a unit vector in the k-th direction; and
      $l_{11}^{(1)}$ corresponds to the integral length scale of the airflow (38) generated by the front fan (14), in the direction of a chord (40) of the profile, or parallel to the general axis (X) of the turbomachine,
   b) said distance ($\lambda$) respects the following relationship:

$$e<\lambda \le d-e \text{ where } d/\lambda \ne 1, 2, 3, \ldots, \text{ where}$$

e corresponds to the width of the airflow (38) generated by a blade (140) from the front fan (14), said width being calculated at a point where half of the maximum turbulent kinetic energy, K_max, generated in said wake is found; e being estimated from the criterion $e=l_{22}^{(2)}/0.21$ to within 40% where $l_{22}^{(2)}$ corresponds to the integral length scale of the airflow (38) generated by the front fan (14), in the circumferential direction (40) of the profile, or perpendicular to the general axis (X) of the turbomachine; and
   d corresponds to the spacing between two circumferentially consecutive blades (140) of the front fan (14),
   c) the number of teeth (30), depressions (32), or repetition periods of the elemental geometry along the length of the leading edge is equal, within 40%, to the number of the first guide vanes (24, IGV).

2. The turbomachine according to claim 1, wherein:
   the first guide vanes (24, IGV) have an angular position ($\beta$) with respect to the general axis (X), and
   around said general axis (X), at least some of said depressions (32) of the serrated profile (28) are angularly offset with respect to the angular position ($\beta$) of the first guide vanes (24, IGV), so that said at least some of the depressions (32) are angularly interposed between two consecutive first guide vanes (24, IGV) in the circumferential direction.

3. The turbomachine according to claim 2, wherein:
   the front fan (14) is adapted to rotate in a predetermined direction (Y) about said general axis (X) such that the airflow (38) downstream of the fan is obliquely oriented with respect to said general axis (X) at an angle ($\alpha$), and the teeth (30) are inclined circumferentially around said general axis (X) towards the oblique orientation (α) of the airflow downstream of the front fan (14).

4. The turbomachine according to claim 2, wherein:
the first guide vanes (24, IGV) individually have a camber line (240) and a leading edge (25), and
the teeth (30) are, circumferentially around said general axis (X) and individually, oriented generally in the direction of a tangent (42) to the camber line (240) of a respective guide vane of said first guide vanes (24, IGV) passing by the leading edge (25) of the respective guide vane, said tangent forming a (β) non-zero angle with respect to the direction of the general axis (X) of the turbomachine.

5. The turbomachine according to claim 2, wherein:
the depressions (32) of the serrated profile (28) have bottoms (320), and
in the direction of said general axis (X), at least some of said bottoms (320) of the depressions belong to a first surface (Y1, Y2) which is transverse to said general axis (X) and is positioned further downstream or upstream than a second surface (Y'1, Y'2) transverse to said general axis (X) to which belong at least some leading edges (25) of the first guide vanes (24, IGV).

6. The turbomachine according to claim 2, in which the teeth (30) and depressions (32) of the serrated profile have individually a wavy shape, having rounded or sharp tops (31).

7. The turbomachine according to claim 1, wherein:
the front fan (14) is adapted to rotate in a predetermined direction (Y) about said general axis (X) such that the airflow (38) downstream of the fan is obliquely oriented with respect to said general axis (X) at an angle (α), and
the teeth (30) are inclined circumferentially around said general axis (X) towards the oblique orientation (α) of the airflow downstream of the front fan (14).

8. The turbomachine according to claim 7, wherein:
the first guide vanes (24, IGV) individually have a camber line (240) and a leading edge (25), and
the teeth (30) are, circumferentially around said general axis (X) and individually, oriented generally in the direction of a tangent (42) to the camber line (240) of a respective guide vane of said first guide vanes (24, IGV) passing by the leading edge (25) of the respective guide vane, said tangent forming a (β) non-zero angle with respect to the direction of the general axis (X) of the turbomachine.

9. The turbomachine according to claim 7, wherein:
the depressions (320) of the serrated profile (28) have bottoms, and
in the direction of said general axis (X), at least some of said bottoms (320) of the depressions belong to a first surface (Y1, Y2) which is transverse to said general axis (X) and is positioned further downstream or upstream than a second surface (Y'1, Y'2) transverse to said general axis (X) to which belong at least some leading edges (25) of the first guide vanes (24, IGV).

10. The turbomachine according to claim 7, in which the teeth (30) and depressions (32) of the serrated profile have individually a wavy shape, having rounded or sharp tops (31).

11. The turbomachine according to claim 1, wherein:
the first guide vanes (24, IGV) individually have a camber line (240) and a leading edge (25), and
the teeth (30) are, circumferentially around said general axis (X) and individually, oriented generally in the direction of a tangent (42) to the camber line (240) of a respective guide vane of said first guide vanes (24, IGV) passing by the leading edge (25) of the respective guide vane, said tangent forming a (β) non-zero angle with respect to the direction of the general axis (X) of the turbomachine.

12. The turbomachine according to claim 11, wherein:
the depressions (32) of the serrated profile (28) have bottoms (320), and
in the direction of said general axis (X), at least some of said bottoms (320) of the depressions belong to a first surface (Y1, Y2) which is transverse to said general axis (X) and is positioned further downstream or upstream than a second surface (Y'1, Y'2) transverse to said general axis (X) to which belong at least some leading edges (25) of the first guide vanes (24, IGV).

13. The turbomachine according to claim 11, in which the teeth (30) and depressions (32) of the serrated profile have individually a wavy shape, having rounded or sharp tops (31).

14. The turbomachine according to claim 1, wherein:
the depressions (32) of the serrated profile (28) have bottoms (320), and
in the direction of said general axis (X), at least some of said bottoms (320) of the depressions belong to a first surface (Y1, Y2) which is transverse to said general axis (X) and is positioned further downstream or upstream than a second surface (Y'1, Y'2) transverse to said general axis (X) to which belong at least some leading edges (25) of the first guide vanes (24, IGV).

15. The turbomachine according to claim 14, in which the teeth (30) and depressions (32) of the serrated profile have individually a wavy shape, having rounded or sharp tops (31).

16. The turbomachine according to claim 1, in which the teeth (30) and depressions (32) of the serrated profile have individually a wavy shape, having rounded or sharp tops (31).

17. The turbomachine according to claim 1, characterized in that it is adapted to propel an aircraft (100).

\* \* \* \* \*